US010770928B2

(12) United States Patent
Malkin et al.

(10) Patent No.: US 10,770,928 B2
(45) Date of Patent: Sep. 8, 2020

(54) WIRELESS CHARGING DEVICE WITH MULTI-TONE DATA RECEIVER

(71) Applicant: Apple Inc., Cupertino, CA (US)

(72) Inventors: Moshe H. Malkin, Menlo Park, CA (US); Manu Agarwal, Palo Alto, CA (US); Alin I. Gherghescu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 15/895,761

(22) Filed: Feb. 13, 2018

(65) Prior Publication Data

US 2018/0351392 A1 Dec. 6, 2018

Related U.S. Application Data

(60) Provisional application No. 62/515,949, filed on Jun. 6, 2017.

(51) Int. Cl.
H02J 50/80 (2016.01)
H02J 7/02 (2016.01)
H02J 50/12 (2016.01)

(52) U.S. Cl.
CPC .............. *H02J 50/80* (2016.02); *H02J 7/025* (2013.01); *H02J 50/12* (2016.02)

(58) Field of Classification Search
CPC .................................... H02J 7/00; H02J 50/00
USPC ........................................................ 307/104
See application file for complete search history.

(56) References Cited

U.S. PATENT DOCUMENTS

| 5,113,389 | A | * | 5/1992 | Cox | H04B 3/232 |
| | | | | | 370/291 |
| 6,091,362 | A | * | 7/2000 | Stilp | G01S 5/02 |
| | | | | | 342/465 |
| 6,211,799 | B1 | * | 4/2001 | Post | H02J 50/05 |
| | | | | | 341/33 |
| 6,342,844 | B1 | * | 1/2002 | Rozin | G07B 15/063 |
| | | | | | 340/928 |
| 8,946,939 | B2 | * | 2/2015 | Drennen | H02J 7/025 |
| | | | | | 307/104 |
| 9,184,802 | B2 | * | 11/2015 | Lee | H04B 5/0031 |

(Continued)

Primary Examiner — Rexford N Barnie
Assistant Examiner — Joseph N Inge
(74) Attorney, Agent, or Firm — Treyz Law Group, P.C.; Jason Tsai

(57) ABSTRACT

A wireless power transmitting device transmits wireless power signals modulated at a given power frequency to a wireless power receiving device using a wireless power transmitting coil. The wireless power receiving device may transmit data signals to the wireless power transmitting device. The wireless power transmitting device may include a data receiver that is coupled to the wireless power transmitting coil and that receives the transmitted data. The data receiver may include an input stage, bandpass filter circuitry, demodulator circuitry, and a data stream combiner. The bandpass filter circuitry may include at least two bandpass filter circuits for passing through signals at the power frequency and some harmonic of the power frequency. The demodulator circuitry may extract amplitude and phase information from the bandpass filtered signals and to generate multiple demodulated data streams. The data stream combiner may correlate the demodulated data streams and combine the correlated data streams.

21 Claims, 5 Drawing Sheets

(56) References Cited

U.S. PATENT DOCUMENTS

| | | | | |
|---|---|---|---|---|
| 9,209,627 B2* | 12/2015 | Baarman | ................ | H02J 50/70 |
| 9,391,469 B2* | 7/2016 | Kim | ................ | H02J 50/80 |
| 2005/0103545 A1* | 5/2005 | Green | ................ | B60L 53/36 |
| | | | | 180/168 |
| 2010/0220878 A1* | 9/2010 | Andersen | ................ | H04L 27/14 |
| | | | | 381/312 |
| 2013/0099584 A1* | 4/2013 | Von Novak, III | ................ | H02J 50/10 |
| | | | | 307/104 |
| 2014/0008990 A1* | 1/2014 | Yoon | ................ | G06F 1/26 |
| | | | | 307/104 |
| 2014/0161018 A1* | 6/2014 | Chang | ................ | H04B 7/0452 |
| | | | | 370/312 |
| 2014/0300202 A1* | 10/2014 | Shimokawa | ................ | H02J 50/90 |
| | | | | 307/104 |
| 2014/0314170 A1* | 10/2014 | Plumb | ................ | H04L 25/4904 |
| | | | | 375/282 |
| 2015/0069854 A1* | 3/2015 | Kim | ................ | H02J 5/005 |
| | | | | 307/104 |
| 2015/0115735 A1* | 4/2015 | Singh | ................ | H02J 5/005 |
| | | | | 307/104 |
| 2016/0336785 A1* | 11/2016 | Gao | ................ | H02J 50/80 |
| 2016/0336976 A1* | 11/2016 | Onishi | ................ | H02J 50/10 |
| 2017/0258402 A1* | 9/2017 | Acquista | ................ | H05K 1/189 |
| 2019/0181697 A1* | 6/2019 | Malkin | ................ | H02J 7/025 |

\* cited by examiner

US 10,770,928 B2

WIRELESS CHARGING DEVICE WITH MULTI-TONE DATA RECEIVER

This application claims the benefit of provisional patent application No. 62/515,949, filed on Jun. 6, 2017, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to wireless power receiving device such as a portable electronic device. The portable electronic device receives the wirelessly transmitted power and uses this power to charge an internal battery or to power the device.

It may sometimes be desirable to transmit data from the wireless power receiving device to the wireless power transmitting device. So-called in-band communications schemes have been developed that allow wireless power receiving devices to communicate with wireless power transmitting devices. In a typical in-band communications scheme, a switching circuit that is coupled to the coil in the wireless power receiving device is used to modulate the load across the coil. The wireless power transmitting device will attempt to detect the modulated signal using a sensing circuit coupled to a coil in the wireless power transmitting device.

In-band communications schemes that are based on this type of load modulation may not always be reliable. Oftentimes, changing the load across the coil at the wireless power receiving device does not necessarily translate to a sufficiently detectable amplitude or phase change at the sensing circuit of the wireless power transmitting device.

SUMMARY

A wireless power transmitting device transmits wireless power signals to a wireless power receiving device. The wireless power transmitting device has an inverter that supplies signals to an output circuit that includes a wireless power transmitting coil. The inverter may modulate the signals at a given power frequency. The wireless power transmitting coil may be part of an array of wireless power transmitting coils that cover a wireless charging surface associated with the wireless power transmitting device.

The wireless power receiving device may transmit data signals to the wireless power transmitting device for authentication purposes (as an example). The wireless power transmitting device may include a data receiver that is coupled to the wireless power transmitting coil and that receives the transmitted data signals. The data signals may be modulated at a data rate that is different than the power frequency (e.g., by dynamically adjusting the impedance at the wireless power receiving device at an arbitrary rate in relation to the power frequency).

The data receiver may include an input stage, bandpass filter circuitry, demodulation circuitry, and a data stream combiner. The input stage may include a voltage attenuator, a low-pass anti-aliasing filter for rejecting high frequency components (e.g., frequency components greater than the third harmonic or higher multiple of the power frequency), and a data converter. The bandpass filter circuitry may receive digital signals from the data converter. The bandpass filter circuitry may generate bandpass filtered signals (e.g., at least first bandpass filtered signals at the power frequency, second bandpass filtered signals at a second harmonic of the power frequency, and third bandpass filtered signals at a third harmonic of the power frequency).

The demodulation circuitry may receive the bandpass filtered signals and may be configured to extract amplitude and phase information from each of the separate bandpass filtered signal streams. For example, the demodulation circuitry may extract in-phase (I) and quadrature (Q) signals from the bandpass filtered signals. The IQ signal components may be oversampled using accumulator circuits and then down-sampled to generate multiple demodulated data streams.

The data stream combiner may include alignment circuits that receive the demodulated data streams from the demodulator circuitry. The data stream combiner may also include an adaptation circuit that examines preamble bits at the output of the accumulator circuits to recover bit boundaries, computes corresponding weights based on the examination of the preamble bits, and applies the computed weights to the multiple data streams to obtain maximum power correlation among the multiple data streams (e.g., by aiming to maximize the signal to noise ratio of the combined data stream). The combiner might implement more complicated combining schemes with many possible implementations and purposes. For example, the combiner could combine streams to improve the detection or to combine the streams such that an interfering signal present in the streams is reduced to improved data detection. Additionally, the combiner might be a more general combiner where each stream is filtered and processed with a multi-tap filter meant to shape the stream so when combined with the other streams, improved detection sensitivity or distortion suppression can be achieved.

After the demodulated data streams have be aligned or correlated, the correlated data streams may be combined using a summing circuit in the data stream combiner. The combined signal at the output of the summing circuit may be an accurate representation of the transmitted data, regardless of the orientation, position, coupling, charging systems conditions (e.g., load, wireless power frequency, wireless power waveform properties such as amplitude, duty cycles, harmonic content, coil filtering, etc.) at which the wireless power receiving device is operated.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, other portable electronic device, or other wireless power receiving equipment.

During operation, the wireless power transmitting device supplies alternating-current signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Figure 1:
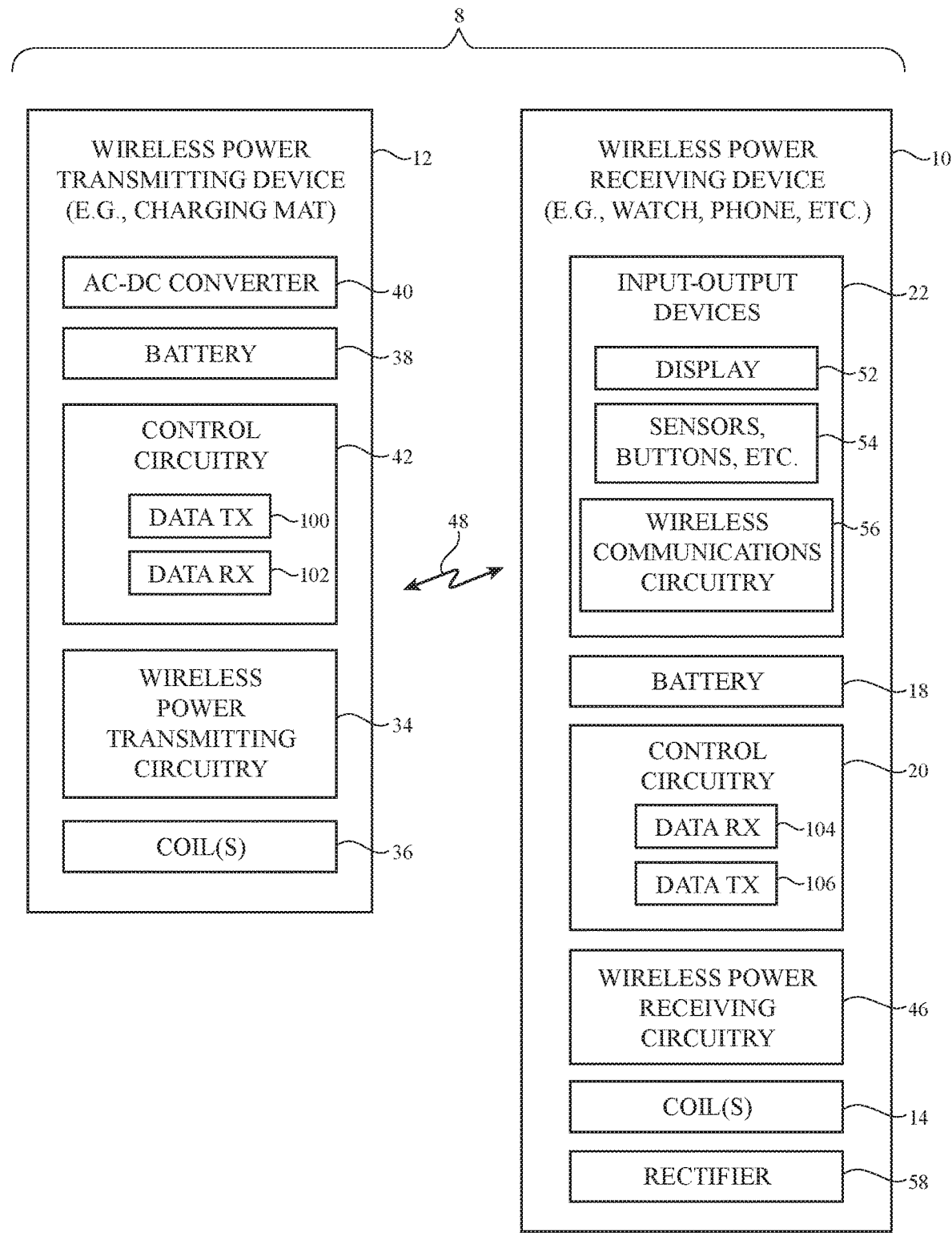
FIG. 1 is a schematic diagram of an illustrative wireless charging system in accordance with an embodiment.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations may sometimes be described herein as an example.

Devices 12 and 10 include control circuitry 42 and 20, respectively. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

During operation of system 8, a user places one or more devices 10 on the charging surface of device 12. Power transmitting device 12 is coupled to a source of alternating-current voltage such as an alternating-current power source (e.g., a wall outlet that supplies line power or other source of mains electricity), has a battery such as battery 38 for supplying power, and/or is coupled to another source of power. A power converter such as AC-DC power converter 40 can convert power from a main power source or other AC power source into DC power that is used to power control circuitry 42 and other circuitry in device 12. During operation, control circuitry 42 uses wireless power transmitting circuitry 34 and one or more coils 36 coupled to circuitry 34 to transmit alternating-current electromagnetic signals 48 to device 10 and thereby convey wireless power to wireless power receiving circuitry 46 of device 10.

Wireless power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the inverter circuit, alternating-current electromagnetic fields (wireless power signals 48) are produced that are received by one or more corresponding coils 14 coupled to wireless power receiving circuitry 46 in receiving device 10. When the alternating-current electromagnetic fields are received by coil 14, corresponding alternating-current currents and voltages are induced in coil 14.

Rectifier circuit 58, which is sometimes considered to be part of circuitry 46, converts the received AC signals (e.g., received alternating-current currents and voltages associated with wireless power signals 48) from one or more coils 14 into DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with control circuitry 42 of device 12 and/or other equipment, audio components, and other components (e.g., input-output devices 22 and/or control circuitry 20) and are used in charging an internal battery in device 10 such as battery 18.

Device 12 and/or device 10 may communicate wirelessly. Devices 10 and 12 may, for example, have wireless transceiver circuitry in control circuitry 42 and 20 (and/or wireless communications circuitry such as circuitry 56) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.).

When it is desired to transmit data from device 12 to device 10, data transmitter circuitry 100 in control circuitry 42 may be used in modulating the signals that are supplied to coil 36. Control circuitry 20 of power receiving device 10 may use a data receiver circuit such as data receiver 104 to demodulate the modulated signal pulses from transmitter 100. Conversely, data transmitter circuit 106 of device 10 may be used in producing signals that are transmitted by coil 14 to coil 36 of device 12 and that are demodulated by data receiver 102 in control circuitry 42 of device 12.

When it is desired to transmit data from device 10 to device 12, device 12 may optionally cease transmission of power. While device 12 is not transmitting wireless power to device 24, data transmitter circuit 106 of device 10 may modulate one or more transistors in wireless power receiving circuitry 46 or control circuitry 20, thereby creating wireless signals that are transmitted from coil 14 to coil 36 of device 12. Because data signals are conveyed wirelessly from device 10 to device 12 using coils 14 and 36, this type of data communications between device 10 and device 12 may sometimes be referred to as "in-band" communications. Device 12 may use data receiver 102 to demodulate the wireless signals from device 10 and thereby receive the data transmitted from device 10. The transmitted data may be used to authenticate device 10 to device 12, may be used to supply feedback or other control signals to device 12, or may be used to convey other information. This example in which transmission of power is temporarily suspended during data transmission is merely illustrative. If desired, wireless power transmission and data reception may occur simultaneously (without ceasing the transmission of power).

When device 12 is in power transmission mode, control circuitry 42 may use a pulse-width modulation (PWM) envelope to modulate the AC drive signals that are being supplied to output inverter transistors coupled to coil 36 and thereby adjust how much power is being supplied to device 10. The duty cycle of the PWM pulse train (pulse envelope) may be adjusted dynamically to adjust the amount of power being wirelessly transmitted from device 12 to device 10. The duty cycle of the PWM envelope may, if desired, be adjusted based on power transmission feedback information that is conveyed in-band from data transmitter 106 to data receiver 102. For example, device 12 can use information that has been transmitted back from device 10 to device 12 to increase or decrease the amount of transmitted power that device 12 is providing to device 10.

The output inverter transistors in wireless power transmitting circuitry 34 are modulated to create an AC output waveform signal suitable for driving drive coil 36 for wireless power transfer. In some examples this signal has a frequency in the kilo-Hertz range, such as between 100 to 400 kHz, including frequencies particularly in the 125 to 130 kHz range. In some examples this signal is in the mega-Hertz range, such as about 6.78 MHz or more generally between 1 to 100 MHz. In some examples this signal is in the giga-Hertz range, such as about 60 GHz and more generally between 1 to 100 GHz. As this AC signal passes through coil 36, a corresponding wireless power signal (electromagnetic signal 48) is created and conveyed to coil 14 of device 10. This AC frequency at which power transmitting circuitry 34 is modulated is sometimes referred to as the power carrier frequency ("fp"). Data signals received at receiver 102 may be modulated at a lower frequency. For example, when transferring power in the 100 kHz range, data signals may be received at about 2 kHz (or other suitable frequency above or below 2 kHz).

Figure 2:
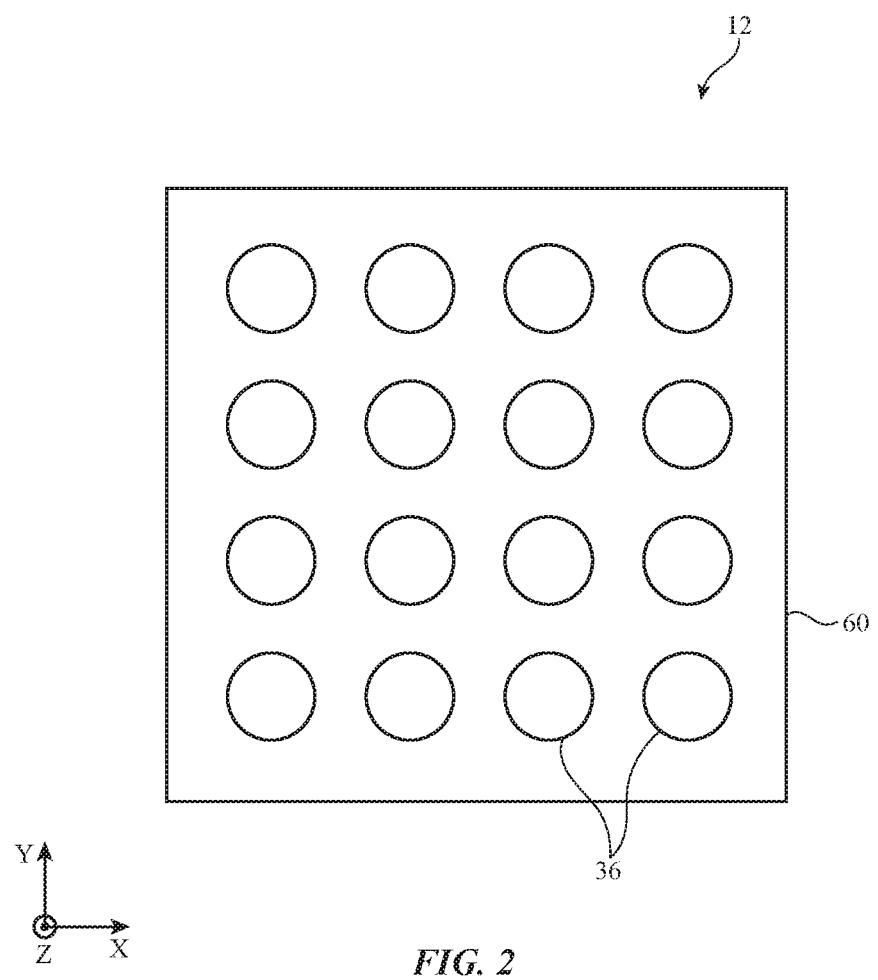
FIG. 2 is a top view of an illustrative wireless power transmitting device with an array of coils that forms a wireless charging surface in accordance with an embodiment.

With one illustrative configuration, wireless transmitting device 12 is a wireless charging mat or other wireless power transmitting equipment that has an array of coils 36 that supply wireless power over a wireless charging surface. This type of arrangement is shown in FIG. 2. In the example of FIG. 2, device 12 has an array of coils 36 that lie in the X-Y plane. Coils 36 of device 12 are covered by a planar dielectric structure such as a plastic member or other structure forming charging surface 60. The lateral dimensions (X and Y dimensions) of the array of coils 36 in device 36 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern or other pattern.

During operation, a user may place one or more devices 10 on charging surface 60. Depending on the position and the orientation at which device 10 is placed on charging surface 60, the electric coupling between coils 36 and coil(s) 14 may be different. For example, device 10 may be placed on charging surface 60 such that coil 14 only overlaps with a first portion of coils 36. In another instance, device 10 may be placed on charging surface 60 such that coil 14 overlaps with a second portion of coils 36 that is different than the first portion. As a result, data transmission between devices 10 and 12 may be affected by the exact placement of device 10 on charging surface 60. In order for device 10 to properly authenticate device 10 to device 12 in a variety of scenarios, the in-band communications between devices 10 and 12 should be properly handled regardless of how portable device 10 is being placed on charging surface 60. In accordance with an embodiment, a data receiver circuit such as data receiver circuit 102 of the type shown in FIG. 3 is provided that is capable of handling data reception in all types of operating environments.

Figure 3:
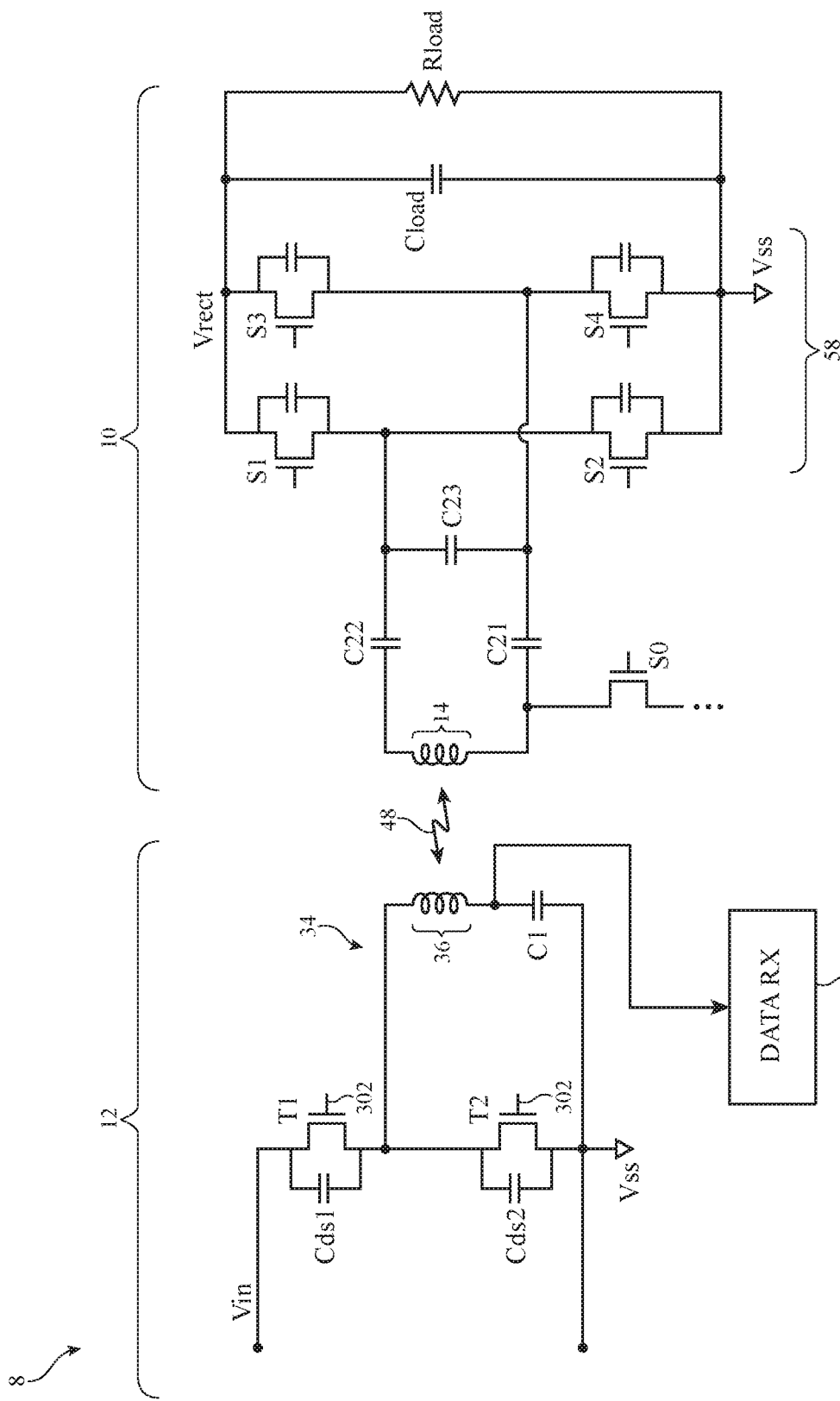
FIG. 3 is a circuit diagram of illustrative devices in a system of the type shown in FIG. 1 in accordance with an embodiment.

FIG. 3 is a circuit diagram showing illustrative circuitry that may be used for a wireless power transmitting device and wireless power receiving device in system 8. As shown in FIG. 3, wireless power transmitting device 12 may receive a DC voltage Vdc from AC-DC converter 40 (FIG. 1). Control circuitry 42 may produce control signals that are applied to gate terminals 302 of inverter transistors T1 and T2. Gates 302 of transistors T1 and T2 may receive complementary signals so that the gate of transistor T1 is high when the gate of transistor T2 is low, and vice versa. With one illustrative configuration, transistors T1 and T2 may be supplied with an AC signal at 200 kHz or other suitable frequency that is modulated with a PWM envelope at 2 kHz or other suitable PWM frequency. Other suitable control signals may be applied to T1 and T2, if desired. Transistors T1 and T2 may be characterized by an internal diode and drain-source capacitance (see, e.g., capacitances Cds1 and Cds2), as shown schematically in FIG. 2.

Transistors T1 and T2 are coupled in series between a positive voltage terminal (at power supply voltage Vdc and a ground power supply terminal (at ground voltage Vss). Coil 36 has a first terminal coupled to a node between transistors T1 and T2 and a second terminal coupled to ground via capacitor C1. As the control signals are applied to gates 302 of output transistors T1 and T2, the DC voltage Vdc is converted into an AC current that passes through capacitor C1 and coil 36. This produces corresponding wireless signal 48, which is transmitted to device 10 and received by coil 14 in device 10. In general, coil 36 in FIG. 3 may represent one or more wireless power transmitting coils in device 12, optionally arranged in an array as shown in FIG. 2. Similarly, coil 14 in FIG. 3 may represent one or more wireless power receiving coils in device 10.

The received AC signal from coil 14 is conveyed through capacitors C21 and C22 to a bridge circuit of rectifier circuit 58. Capacitor C23 may be coupled between capacitors C21 and C22. Transistors S1-S4 of rectifier 58 may be operated in a synchronous rectifier mode to rectify the received signal and thereby produce rectified DC signal (voltage) Vrect across capacitor Cload and resistance Rload. In synchronous rectifier operation, control circuitry within wireless power receiving circuitry 46 senses the voltage at the drain of each transistor and uses the sense voltage as a trigger signal to actively turn on each transistor when appropriate. Synchronous rectifier operation may enhance rectification efficiency by eliminating power loss due to diode turn-on voltages. Capacitor Cload may store rectified voltage Vrect that is generated by the bridge circuit of rectifier 58 across the output load Rload. During normal operation, a charger (not shown) can use the DC voltage Vrect to charge battery 18 and to supply power to system circuitry in device 10 (see FIG. 1).

Data may be transmitted from device 12 to device 10. For example, the PWM signal that is applied to transistors T1 and T2 may be modulated by transmitter 100 using a modulation scheme such as frequency-shift keying (FSK) or other suitable modulation scheme. Data receiver 104 may have a detector circuit configured to detect the modulated data signal from transmitter 100. Data transmission from device 12 to device 10 may take place during power transmission from device 12 to device 10.

When it is desired to transmit data from device 10 to device 12, data transmitter 106 of control circuitry 20 may modulate at least transistor S0 in accordance with the data being transmitted. As described above, device 12 may optionally cease power transmission operations during the transmission of in-band data from device 10 to device 12. In the example of FIG. 3, transistor S0 may be coupled to the node between coil 14 and capacitor C21. Transistor S0 configured in this way may serve as an impedance adjustment switch and may be coupled to other passive impedance modifying circuitry (e.g., one or more inductors, capacitors, and/or resistors coupled in series, in parallel, and some combination of the two). The example of FIG. 3 in which switch S0 is coupled to the node between inductor 14 and capacitor C21 is merely illustrative. In general, switch S0 may be coupled to capacitor C22, to capacitor C23, or any other node of device 10 shown in FIG. 3.

When switch S0 is closed (e.g., when transistor S0 is turned on), the circuitry coupled to coil 14 may exhibit a first impedance. When switch S0 is open (e.g., when transistor S0 is turned off), the circuitry coupled to coil 14 may exhibit a second impedance that is different than the first impedance. Device 10 is therefore modulating data by changing the impedance at coil 14. Device 12 may be configured to decode the corresponding data by sensing the perturbation in the waveform based on the impedance changes. In general, any suitable modulation scheme may be used to support transmission of data from device 10 to device 12. With one illustrative configuration, transmitter 106 may modulate transmitted data using a modulation scheme such as amplitude-shift keying (ASK) modulation.

Switch S0, which is sometimes considered to be part of data transmitter circuit 106, may (for example) be modulated at an AC frequency of about 2 kHz (or other suitable frequency between 1 to 10 kHz). The frequency at which data being transmitted from device 10 to device 12 is modulated is sometimes referred to as the "data rate." In the scenario in which transmitter 106 modulates transmitted signals using ASK modulation, the data rate is sometimes referred to as the ASK data modulation rate or $f_{ASK}$.

In contrast, the frequency at which inverter transistors T1 and T2 at device 12 are modulated may sometimes be referred to as the "carrier" frequency, the "power" frequency, or the power carrier frequency (fp). Output inverter transistors T1 and T2 in wireless power transmitting circuitry 34 may, for example, be modulated at a power frequency of about 120 kHz (or other suitable frequency between 100 to 400 kHz) to create an AC signal to drive coil 36. As this AC signal passes through coil 36, a corresponding wireless power signal (electromagnetic signal 48) is created and conveyed to coil 14 of device 10. In general, the data rate is independent of the power carrier frequency (e.g., frequency fp can be adjusted while data rate $f_{ASK}$ remains constant, or vice versa). Because the data signals are being transmitted in-band, the 2 kHz data signals may be modulated on top of the power carrier frequency.

Communicating by modulating the impedance can be challenging because changing the impedance at device 10 does not necessarily translate to a detectable amplitude change at device 12 (e.g., in the case of ASK modulation at data transmitter 106). A data receiver that only monitors the received data at power carrier frequency fp may be incapable of discerning any meaningful amplitude or phase shift in response to the ASK modulation at data transmitter 106.

In accordance with an embodiment, a more robust data receiver such as data receiver 102 is provided that is capable of properly decoding data conveyed via impedance adjustments. Still referring to FIG. 3, data receiver 102 may be coupled to the node between coil 36 and capacitor C1. This arrangement is merely illustrative. In general, data receiver 102 may be coupled to the node between transistors T1 and T2, or any other suitable node within device 12.

Figure 4:
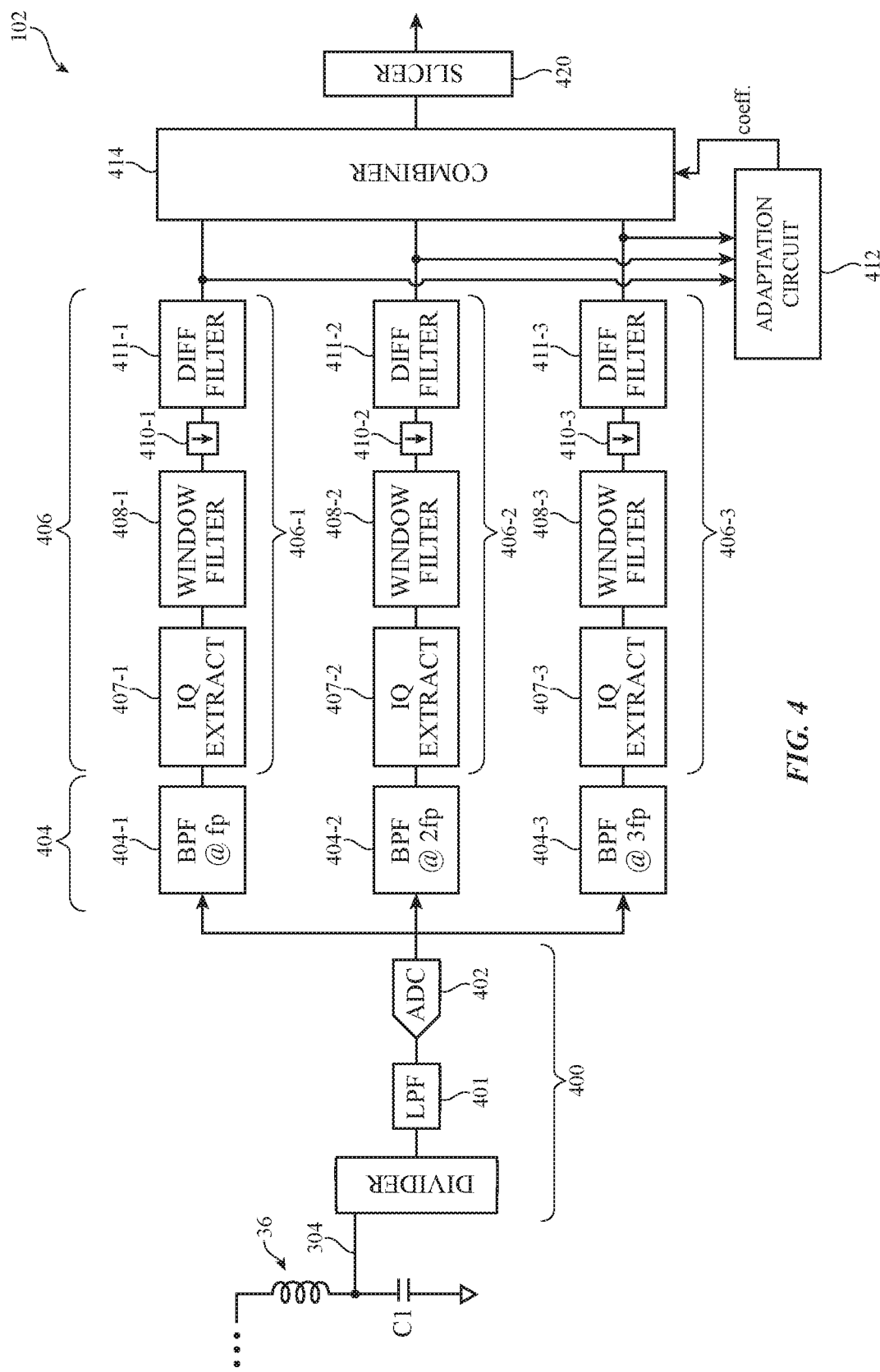
FIG. 4 is a diagram of an illustrative data receiver within a wireless power transmitting device in accordance with an embodiment.

FIG. 4 shows one suitable circuit implementation of data receiver 102. As shown in FIG. 4, data receiver 102 may include an input stage 400, bandpass filter circuitry 404 that receives signals from input stage 400 and generates corresponding bandpass filtered signals, demodulator circuitry 406 that receives the bandpass filtered signals from circuitry 404 and generates corresponding multiple demodulated data streams, and a data stream combiner 414 that receives and combines the multiple demodulated data streams from circuitry 406 to provide a final data output. Input stage 400 may include an attenuator formed using a divider circuit (e.g., a resistor divider or other suitable types of divider circuitry), low-pass filter circuit 401 that receives signals from the attenuator, and analog-to-digital converter 402 that receives signals from low-pass filter 401. The example of FIG. 4 in which the attenuator is coupled to the node between coil 36 and capacitor C1 via path 304 is merely illustrative. In general, the attenuator in stage 400 may be coupled to any other node of wireless power transmitter circuitry 34 (FIG. 1).

Low-pass filter 401 may be an analog filter circuit. As described above, signals may be modulated at an AC frequency (sometimes referred to herein as the power carrier frequency fp) of at least 100 kHz at wireless power transmitter circuitry 34. Analog low-pass filter 401 may be configured to filter out undesired high frequency components received from the attenuator. For example, filter 401 may be configured to pass through low frequency components such as signal components at power frequency fp, signal components at two times fp, and signal components at three times fp and to filter out signals having frequencies greater than 3*fp. In this context, power frequency fp can be referred to as the "fundamental frequency" while frequency 2*fp (i.e., a first integer multiple of the fundamental frequency) can be referred to as the "second harmonic" frequency and while frequency 3*fp (i.e., a second integer multiple of the fundamental frequency) can be referred to as the "third harmonic" frequency, and so on. In general, the analog filtering is configured to reject signals not needed for detection, but that might interfere with the demodulation either through linear coupling and/or aliasing and/or form non-linearity that could cause the circuitry, which could distort the desires signals. This is merely illustrative. If desired, filter 401 may be configured to pass through signal components up to only the second harmonic frequency, to pass through signal components up to the fourth harmonic frequency or greater than the fourth harmonic frequency, etc.

Data converter 402 may receive low-pass filtered signals from filter 401 and may convert the received analog signals into digital signals. In particular, data converter 402 may output digital signals at a given sampling rate. As an example, A/D converter 402 may be configured to output signals at 2 Msps (mega-samples per second). In this example, filter 401 may be operated to ensure interference above the 1 MHz are sufficiently rejected at the ADC input. Configured in this way, low-pass filter 401 may serve as an anti-aliasing filter for data converter 402.

Bandpass filter circuitry 404 may receive the converted sampled signals from data converter 402. In the example of FIG. 4, bandpass filter circuitry 404 may include a first bandpass filter circuit 404-1 configured to selectively pass signals at fundamental frequency fp and to generate corresponding first bandpass filtered signals, a second bandpass filter circuit 404-2 configured to selectively pass signals at second harmonic frequency 2*fp and to generate corresponding second bandpass filtered signals, and a third bandpass filter circuit 404-3 configured to selectively pass signals at third harmonic frequency 3*fp and to generate corresponding third bandpass filtered signals. In general, the digital signal at the output of the ADC could be filtered to further reduce noise and undesired components.

If desired, additional bandpass filter circuits at higher harmonic frequencies may also be included. Adding more bandpass filters may yield improved accuracy (albeit at diminish returns since the power levels at higher order harmonics are reduced) at the cost of increased circuit area and power consumption. In general, bandpass filter circuitry 404 may include at least two bandpass filter circuits or more than three bandpass filter circuits configured to selectively pass signal components at any number of desired frequencies. Separating the received signal into different frequency streams (e.g. into the fundamental frequency stream and associated harmonic frequency streams) may be advantageous since amplitude and/or frequency changes at each frequency component are easier to detect than when looking at a single data stream that lumps together all the different frequency components.

The bandpass filtered signal streams may then be fed to demodulator circuitry 406. As shown in FIG. 4, demodulator circuitry 406 may include a first demodulator circuit 406-1 that receives the first bandpass filtered signals from circuit 404-1, a second demodulator circuit 406-2 that receives the second bandpass filtered signals from circuit 404-2, and a third demodulator circuit 406-3 that receives the third bandpass filtered signals from circuit 404-3. First demodulator circuit 406-1 may include extraction circuit 407-1, window filter circuit 408-1, down-sampling circuit 410-1, and difference filter circuit 411-1.

Extraction circuit 407-1 may be configured to extract in-phase (I) and quadrature (Q) signal components from the first bandpass filtered signals. Extraction circuit 407-1 may therefore sometimes be referred to as an IQ extractor. Extraction circuit 407-1 may, for example, be configured to implement the Goertzel algorithm at the fundamental power frequency fp (e.g., circuit 407-1 may multiply the first bandpass filtered signals by a local oscillator frequency to isolate the desired phase and amplitude components). Other possible implementations include down-conversion using a lookup table to generate sinusoidal components or a CORDIC engine to generate sinusoids to be used for down-conversion.

Window filter 408-1 may receive the IQ signals from extraction circuit 407-1 and may be configured to accumulate the received signals and to generate a corresponding moving average by oversampling the received signals. Filter 408-1 may output oversampled signals to down-sampling circuit 410-1. Down-sampling circuit 410-1 may be configured to down-sample the received signals. Circuit 410-1 may then output the down-sampled signals to difference filter 411-1. Difference filter 411-1 may be configured to remove any DC bias from the down-sampled signals to generate a first demodulated data stream, which is provided to data stream combiner 414.

Similarly, second demodulator circuit 406-2 may include extraction circuit 407-2, window filter circuit 408-2, down-sampling circuit 410-2, and difference filter circuit 411-2. Extraction circuit 407-1 may be configured to extract IQ signal components from the second bandpass filtered signals. Extraction circuit 407-2 may, for example, be configured to implement the Goertzel algorithm at the second harmonic frequency 2*fp.

Window filter 408-2 may receive the IQ signals from extraction circuit 407-2 and may be configured to accumulate the received signals and to generate a corresponding moving average by oversampling the received signals. Filter 408-2 may output the oversampled signals to down-sampling circuit 410-2. Down-sampling circuit 410-2 may be configured to down-sample the received signals. Circuit 410-1 may then output the down-sampled signals to difference filter 411-2. Difference filter 411-2 may be configured to remove any DC bias from the down-sampled signals to generate a second demodulated data stream, which is provided to data stream combiner 414.

Similarly, third demodulator circuit 406-3 may include extraction circuit 407-3, window filter circuit 408-3, down-sampling circuit 410-3, and difference filter circuit 411-3. Extraction circuit 407-3 may be configured to extract IQ signal components from the third bandpass filtered signals. Extraction circuit 407-3 may, for example, be configured to implement the Goertzel algorithm at the third harmonic frequency 3*fp.

Window filter 408-3 may receive the IQ signals from extraction circuit 407-3 and may be configured to accumulate the received signals and to generate a corresponding moving average by oversampling the received signals. Filter 408-3 may output oversampled signals to down-sampling circuit 410-3. Down-sampling circuit 410-3 may be configured to down-sample the received signals. Circuit 410-3 may then output the down-sampled signals to difference filter 411-3. Difference filter 411-3 may be configured to remove any DC bias from the down-sampled signals to generate a third demodulated data stream, which is provided to data stream combiner 414.

The example above in which extraction circuits 407-1, 407-2, and 407-3 implement the Goertzel algorithm is merely illustrative. In general, extraction circuits 407 may be implemented using any suitable demodulation scheme to extract desired phase and amplitude information from the bandpass filtered signals. If desired, windowing circuits 408 may be configured to implement a weighted accumulation scheme to achieved enhanced interference rejection.

Referring still to FIG. 4, data stream combiner 414 may be configured to align the multiple data streams received from demodulator circuitry 406. Data receiver 102 may also include an adaptation circuit such as adaptation circuit 412 (which is sometimes considered to be a part of data stream combiner 414) that monitors the signals at the output of difference filter circuits 411. For example, adaptation circuit 412 may look for preamble bits in each of the data streams to help recover bit boundaries and to generate corresponding weights by matching the maximum energy with a known preamble (e.g., circuit 412 may determine the relative correlation among the different streams and to generate corresponding weights or matching coefficients that help improve or maximize the power or signal-to-noise ratio among the multiple data streams). Adaptation circuit 412 may perform matching using a least mean squares (LMS) algorithm, a least squares approach, or other stochastic methods for minimizing the amount of error between the different signal streams.

Weights or coefficients generated by adaptation circuit 412 may then be fed back into combiner 414 to help align or match the different data streams. For example, circuit 416 may apply a first set of weights to the first IQ data stream, a second set of weights to the second IQ data stream, and third set of weights to the third IQ data stream. For example, these weighting factors may help phase-align the different data streams to help minimize destructive interference. Combiner 414, in conjunction with adaptation circuit 412, configured in this way to align and maximize the power correlation between the multiple data streams is sometimes referred to as a matched filter.

The power-aligned or power-matched data streams may sometimes be referred to as correlated data streams and can be combine using a summing circuit to provide a final data output. Circuit 420 may receive the final data output from combiner 414. In general, circuit 420 may be any type of slicer, such as an equalizer, timing recovery circuit, carrier recovery circuit, zero-crossing detection circuit, or other types of data output circuitry. The final data output generated in this way may exhibit detectable perturbations caused by the impedance modulation at data transmitter 106 (FIG. 1). For example, data receiver 102 may analyze the final combined output of combiner 414 and will be able to decode a meaningful data stream corresponding to the data stream transmitted by data transmitter 106.

The combiner stage is one illustration. In general, the combined streams are sent to the next stage in processing, where data decoding of a single streams takes place, and where many possible detection schemes could be used such as equalizing, performing timing and carrier recovery, zero-crossing detectors, transition detectors, etc.

Additionally, combiner 414 may perform further processing such as filtering each stream with a filter meant to improve the signal quality and/or reject an interference coupled to the information streams. For example, the combiner could combine streams to improve the detection or to combine the streams such that an interfering signal present in the streams is reduced to improved data detection. Additionally, combiner 414 might be a more general combiner where each stream is filtered and processed with a multi-tap filter meant to shape the stream so when combined with the other streams, improved detection sensitivity or distortion suppression can be achieved.

Figure 5:
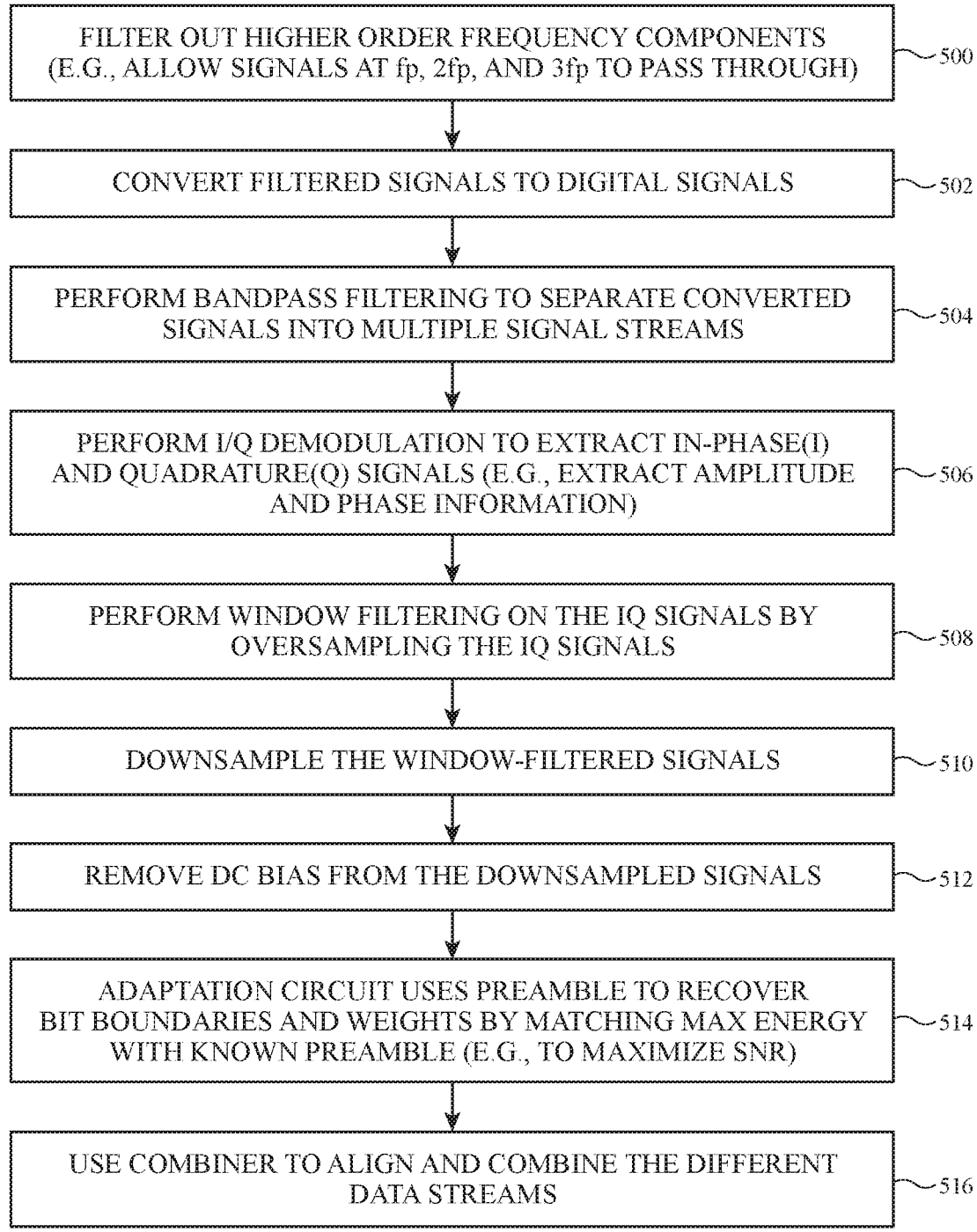
FIG. 5 is a flow chart of illustrative steps for operating the data receiver shown in FIG. 4 in accordance with an embodiment.

FIG. 5 is a flow chart of illustrative steps for operating data receiver 102. At step 500, low-pass filter circuit 401 may receive incoming signals from the attenuator and may be configured to filter out higher order frequency components (e.g., circuit 401 may allow signals at frequencies fp, 2*fp, and 3*fp to pass through while rejecting signals having frequencies greater than 3*fp). At step 502, data converter 402 may convert the filtered signals to digital signals.

At step 504, bandpass filter circuitry 404 may receive the digital signals from data converter 402 and may perform bandpass filtering to generate separate signal streams. For example, first bandpass filter circuit 404-1 may selectively pass through signals at fundamental frequency fp for a first signal stream, second bandpass filter circuit 404-2 may selectively pass through signals at the second harmonic (H2) frequency, and whereas third bandpass filter circuit 404-3 may selectively pass through signals at the third harmonic (H3) frequency.

At step 506, extraction circuits 407 may receive the bandpass filtered signal streams from bandpass filter circuitry 404 and may be configured to extract amplitude and phase information. For example, extractor 407-1 may extract first IQ signals, extractor 407-2 may extract second IQ signals, and extractor 407-3 may extract third IQ signals. In-phase (I) and quadrature (Q) signals obtained in this way can be used collectively to compute desired amplitude and phase information.

At step 508, window filtering circuits 408 may receive the extracted IQ signals from extraction circuits 407 and perform window filtering on the IQ signals (e.g., by oversampling the IQ signals). At step 510, down-sampling circuits 410 may down-sample the window-filtered signals output from filtering circuits 408. At step 512, difference filters 411 may be configured to remove any undesired DC bias from the down-sampled signals output from difference filters 411.

At step 512, adaptation circuit 412 may look for preamble bits at the output of difference filters 411 to detect bit boundaries and to compute weights by matching the maximum energy with the known preamble sequence (e.g., adaptation circuit 412 may be configured to determine the required offset for each stream that yields the maximum correlation among the different data streams).

At step 514, data stream combiner 414 (e.g., a matched filter) may be used to align the multiple demodulated data streams by applying the computed weights and to combine the correlated data streams. In some embodiments, a half-bit decoder may be optionally used to decode the final output. A final data output generated in this way properly represents the data modulated at data transmitter 106 (FIG. 1).

The foregoing is merely illustrative and various modifications can be made to the described embodiments. The foregoing embodiments may be implemented individually or in any combination.

What is claimed is:

1. A wireless power transmitting device operable with a wireless power receiving device that has a wireless power receiving coil modulated to transmit data to the wireless power transmitting device, the wireless power transmitting device comprising:
 a wireless power transmitting coil;
 wireless power transmitting circuitry coupled to the wireless power transmitting coil and configured to transmit wireless power signals with the wireless power transmitting coil; and
 a data receiver coupled to the wireless power transmitting coil, the data receiver comprising:
  a first bandpass filter circuit configured to receive signals from the wireless power transmitting coil, to selectively pass the received signals at a first frequency, and to generate corresponding first bandpass filtered signals;
a second bandpass filter circuit configured to receive the signals from the wireless power transmitting coil, to selectively pass the received signals at a second frequency that is different than the first frequency, and to generate corresponding second bandpass filtered signals;
a first demodulator circuit configured to receive the first bandpass filtered signals and to produce a first demodulated data stream;
a second demodulator circuit configured to receive the second bandpass filtered signals and to produce a second demodulated data stream; and
a data stream combiner configured to correlate the first and second data streams and to combine the correlated first and second data streams.

2. The wireless power transmitting device of claim 1, wherein the second frequency is an integer multiple of the first frequency.

3. The wireless power transmitting device of claim 1, further comprising:
a third bandpass filter circuit configured to receive the signals from the wireless power transmitting coil, to selectively pass the received signals at a third frequency that is different than the first and second frequencies, and to generate corresponding third bandpass filtered signals; and
a third demodulator circuit configured to receive the third bandpass filtered signals and to produce a third demodulated data stream, wherein the data stream combiner is further configured to correlate the third data stream with the first and second data streams and to combine the first, second, and third correlated data streams.

4. The wireless power transmitting device of claim 3, wherein the second frequency is a first integer multiple of the first frequency, and wherein the third frequency is a second integer multiple of the first frequency.

5. The wireless power transmitting device of claim 4, wherein the first demodulator circuit comprises a first amplitude and phase extraction circuit, wherein the second demodulator circuit comprises a second amplitude and phase extraction circuit, and wherein the third demodulator circuit comprises a third amplitude and phase extraction circuit.

6. The wireless power transmitting device of claim 5, wherein the first demodulator circuit further comprises a first oversampling circuit and a first downsampling circuit, the first oversampling circuit configured to receive signals from the first amplitude and phase extraction circuit, wherein the second demodulator circuit further comprises a second oversampling circuit and a second downsampling circuit, the second oversampling circuit configured to receive signals from the second amplitude and phase extraction circuit, and wherein the third demodulator circuit further comprises a third oversampling circuit and a third downsampling circuit, the third oversampling circuit configured to receive signals from the third amplitude and phase extraction circuit.

7. The wireless power transmitting device of claim 3, wherein the data stream combiner comprises:
an adaptation circuit configured to analyze the first, second, and third demodulated data streams and to compute corresponding weighting factors for scaling the first, second, and third demodulated data streams to generate the first, second, and third correlated data streams, respectively; and
a summing circuit configured to combine the first, second, and third correlated data streams.

8. The wireless power transmitting device of claim 7, wherein the data stream combiner further comprises:
filtering circuitry configured to filter the first, second, and third demodulated data streams to improve signal detection and reduce signal distortion.

9. The wireless power transmitting device of claim 7, wherein the data stream combiner further comprises:
a data output circuit that receives signals from the summing circuit, wherein the data output circuit is a circuit selected from the group consisting of: an equalizer circuit, a timing recovery circuit, a carrier recovery circuit, and a zero-crossing detection circuit.

10. The wireless power transmitting device of claim 3, wherein the data receiver further comprises:
a low-pass filter circuit coupled between the wireless power transmitting coil and the first, second, and third bandpass filter circuits; and
an analog-to-digital converter coupled between the low-pass filter circuit and the first, second, and third bandpass filter circuits.

11. The wireless power transmitting device of claim 1, wherein the data stream combiner comprises alignment circuits configured to correlate the first and second data streams by matching the power of the first and second data streams.

12. A wireless power transmitting device operable with a wireless power receiving device that has a wireless power receiving coil modulated to transmit data to the wireless power transmitting device, the wireless power transmitting device comprising:
a wireless power transmitting coil;
wireless power transmitting circuitry coupled to the wireless power transmitting coil and configured to transmit wireless power signals with the wireless power transmitting coil; and
a data receiver coupled to the wireless power transmitting circuitry, the data receiver comprising:
bandpass filter circuitry configured to receive signals from the wireless power transmitting coil and to provide corresponding bandpass filtered signals;
demodulator circuitry configured to produce multiple demodulated data streams from the bandpass filtered signals; and
a data stream combiner configured to produce a corresponding output data stream by aligning the multiple demodulated data streams.

13. The wireless power transmitting device of claim 12, wherein the bandpass filter circuitry comprises:
a first bandpass filter circuit configured to selectively pass the received signals at a given frequency to generate a first portion of the bandpass filtered signals;
a second bandpass filter circuit configured to selectively pass the received signals at a second harmonic of the given frequency to generate a second portion of the bandpass filtered signals; and
a third bandpass filter circuit configured to selectively pass the received signals at a third harmonic of the given frequency to generate a third portion of the bandpass filtered signals.

14. The wireless power transmitting device of claim 13, wherein the demodulator circuitry comprises:
a first extraction circuit configured to receive the first portion of the bandpass filtered signals and to generate corresponding first in-phase and quadrature signals;

a second extraction circuit configured to receive the second portion of the bandpass filtered signals and to generate corresponding second in-phase and quadrature signals; and a third extraction circuit configured to receive the third portion of the bandpass filtered signals and to generate corresponding third in-phase and quadrature signals.

15. The wireless power transmitting device of claim 14, wherein the demodulator circuitry further comprises:

a first oversampling circuit configured to receive the first in-phase and quadrature signals and to generate corresponding first oversampled in-phase and quadrature signals;

a second oversampling circuit configured to receive the second in-phase and quadrature signals and to generate corresponding second oversampled in-phase and quadrature signals; and a third oversampling circuit configured to receive the third in-phase and quadrature signals and to generate corresponding third oversampled in-phase and quadrature signals.

16. The wireless power transmitting device of claim 15, wherein the data stream combiner comprises an adaptation circuit configured to analyze the first, second, and third oversampled in-phase and quadrature signals to compute corresponding weighting factors for scaling the first, second, and third demodulated data streams.

17. The wireless power transmitting device of claim 13, wherein the data receiver further comprises:

an anti-aliasing filter coupled between the wireless power transmitting coil, and the bandpass filtering circuitry.

18. An apparatus comprising:

a coil;

wireless power transmitting circuitry coupled to the coil and configured to transmit wireless power signals with the coil; and a data receiver coupled to the coil, the data receiver comprising:

demodulator circuitry that receives bandpass filtered signals, extracts in-phase and quadrature components from the received bandpass filtered signals, and generates corresponding multiple data streams; and a matched filter that correlates the multiple data streams and combines the correlated multiple data streams.

19. The apparatus of claim 18, wherein the data receiver further comprises:

a first bandpass filter circuit that receives signals from the coil and that provides a first portion of the bandpass filtered signals at a given frequency to the demodulator circuitry;

a second bandpass filter circuit that receives the signals from the coil and provides a second portion of the bandpass filtered signals at a second harmonic of the given frequency to the demodulator circuitry; and a third bandpass filter circuit that receives the signals from the coil and provides a third portion of the bandpass filtered signals at a third harmonic of the given frequency to the demodulator circuitry.

20. The apparatus of claim 19, wherein the data receiver further comprises:

a low-pass filter circuit coupled between the coil and the first, second, and third bandpass filter circuits, the low-pass filter circuit filters out signals having frequencies greater than the third harmonic of the given frequency.

21. The apparatus of claim 18, wherein the matched filter correlates the multiple data streams by examining preamble bits in the multiple data streams to recover bit boundaries, by computing corresponding weights based on the examination of the preamble bits, and by applying the computed weights to the multiple data streams to increase power correlation among the multiple data streams.

* * * * *